June 20, 1967         G. L. BOETTLER         3,326,098
METHOD OF APPLYING A MARKING STRIPE TO A ROAD SURFACE
Filed May 6, 1964
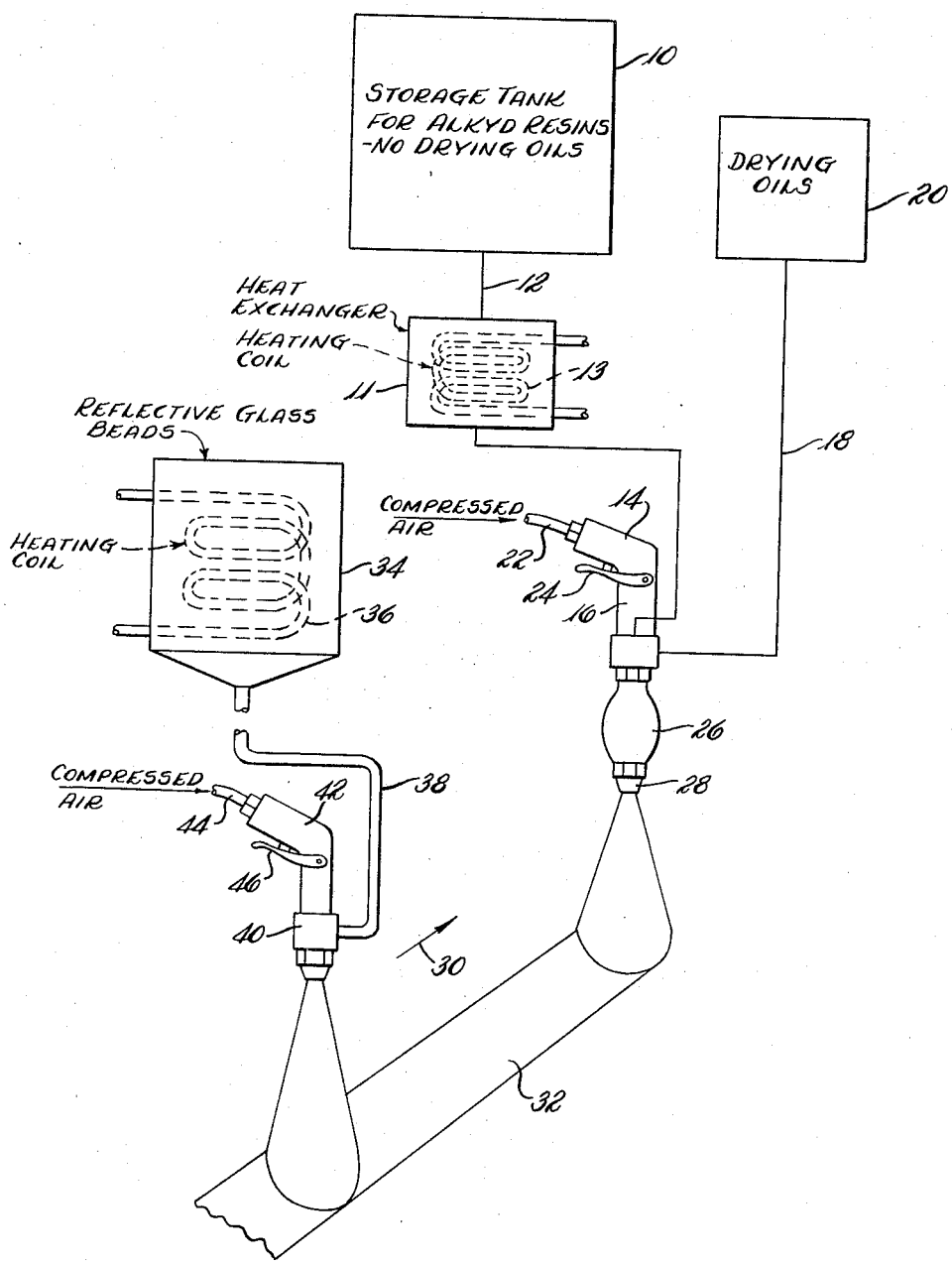
INVENTOR.
GERALD L. BOETTLER
BY Oldham & Oldham
ATTYS.

United States Patent Office 3,326,098
Patented June 20, 1967

3,326,098
METHOD OF APPLYING A MARKING STRIPE
TO A ROAD SURFACE
Gerald L. Boettler, 732 Akron Blvd.,
Kent, Ohio 44240
Filed May 6, 1964, Ser. No. 368,759
4 Claims. (Cl. 94—22)

This invention relates to methods for applying road marking stripes, and to the addition of reflective glass beads thereto.

Resin based coating materials often have high solids content and are normally mixed with solvents and/or drying oils prior to use.

Alkyd resins normally used for painting contain about 30% to 80% solids. In order to spray these materials it has been necessary to add usually about 50% solvent and/or drying oils to thin the resin material. The resin materials appropriately thinned with drying oils are susceptible to scumming during storage which causes difficulty in subsequent spraying attempts.

In applying road marking stripes to highways or other surfaces, glass beads or other reflective materials are often incorporated into the coating material. It has been found that when the coating material also includes large concentrations of solvents and other volatiles, the removal of the volatiles by vaporization causes shrinkage of the laid marking, and the coating material tends to pull away from the glass beads so that the glass beads are not firmly set in the coating material and are unduly exposed to removal by traffic thereover.

It is the general object of the invention to provide improved methods for applying road marking strips of dryable materials.

A further object is to provide such a method for applying dryable materials such as alkyd resins, characterized by improved methods of storage of the materials prior to spraying the materials into place and improved spraying techniques.

Another object of the invention is to provide a method of storing an alkyd resin with only the basic resin, pigment, and filler therein, followed by heating the resin to thin it, followed by the addition of drying oils to the resin as it is passed to the spraying apparatus so that any drying or scumming of the resin in the storage tank is materially reduced while still providing fast drying action in the sprayed resin.

Another object of the invention is to provide a road striping method in accordance with any of the foregoing objects wherein immediately after the application of the stripe to the road surface and while it is still wet, reflective glass beads heated to a temperature in excess of about 250° F. are sprayed against the stripe to embed themselves in the stripe and to greatly speed the drying of the stripe.

A still further object is to provide an improved method for laying a reflective glass bead impregnated marking stripe in which the glass beads remain firmly set during drying of the stripe due to a lesser volume decrease during drying.

Another object of the invention is to heat an alkyd resin paint before applying it as a spray, and to add drying oils just before spraying.

The present invention, in one aspect thereof, is concerned with the prevention of scumming in dryable resins in which drying oils are used. Accordingly, the dryable resin is heated to a temperature at which it is readily flowable, and the flowable resin is passed to an applicator, such as a spray apparatus, for application therefrom to the surface area to be coated. Drying oil is added sufficiently proximate to the position of application from the applicator to materially reduce or prevent scumming of the resin in the total resin handling system and especially reducing scumming in the resin storage tank. The invention may conveniently be carried out, for example, by maintaining separate fluid bodies or supplies of resin and drying oil and mixing withdrawn portions of the separate supplies immediately prior to spraying. The body of resin may contain some drying oil, e.g. a minor amount, but preferably all or at least the major amount of the drying oil to be used with the particular resin is added to the resin just prior to application of the resin to the surface.

The ratios of drying oils to particular resins to obtain a given drying result are well known to those in the art, as are the dryable resins and drying oils compatible therewith. Such resins and oils and particular ratios thereof, as were formerly useful in a particular application or for a particular result, can be used in accordance herewith to provide the added improvement of this invention and are not deemed critical, although certain resins and drying oils, identified hereinbelow, are preferred.

The foregoing objects of the invention, and other objects which will become apparent as the description proceeds, are achieved in one embodiment of the invention by that method of applying a marking stripe to a road surface which includes the steps of storing an alkyd resin having coloring pigments therein and having in the binding resins between about 30% and about 80% solids, separately storing drying oil means for the resin, separately conducting the resin and drying oil means to a position adjacent the road surface, heating the resin during its conduction to a temperature between about 150° and about 275° F., thoroughly mixing the heated resin and drying oil means at said position, spraying the mixture against the road surface while moving over the road surface to provide a stripe, heating reflective glass beads to temperatures between about 250° and about 600° F., and spraying the heated glass beads against the still wet stripe while moving over the road surface to embed the beads into the stripe and to heat-speed the drying of the stripe.

For a better understanding of the invention, reference should be had to the single figure of the drawing which comprises a diagrammatic showing of a typical arrangement of mechanism for the practice of the invention.

In the drawing, the numeral 10 indicates a storage tank for a heat drying or heat setting material, for example, an alkyd resin material. An important feature of the invention is that the basic alkyd resin includes only a limited amount of solvents, such as form a part of the resin as supplied commercially, and with the binding resin containing usually between about 30% and about 80% solids. The method of the invention particularly contemplates the use of an alkyd resin including between about 10% and about 70% by weight of pigmenting materials. Typical white pigmenting materials include rutile base titanium dioxide, silicate white lead, zinc oxide, antimony oxide, and whiting. A typical pigmenting agent for producing yellow is chrome oxide. The resin may also include up to 30% glass beads.

The following is given as a specific example of a suitable formulation of basic resin which can be used in the present method:

| Ingredient: | Parts by weight |
| --- | --- |
| Syntex 70[1] | 35 |
| Rutile base titanium dioxide as a whitener | 10 to 15 |
| #10 whitening (ground washed marble) as a filler | 50 to 55 |

[1] An alkyd resin marketed by Jones Dabney Company and containing about 65% solids and 35% solvent, believed to be mineral spirits and/or toluene.

A conduit 12 carries the alkyd resin material from the storage tank 10 through a heat exchanger 11 having a heating coil 13 whereby the temperature of the resin is raised to between about 150° and about 275° F. This thins the resin so it can be sprayed without driving off solvents or drying oils, and with no danger of explosion. The resin is also rendered in better condition to be now mixed with drying oils, sprayed and quickly dried. The resin now passes to a spray gun indicated as a whole by the numeral 14, the flow from the tank 10 to the gun being by gravity or aided by a pump (not shown). The conduit 12 connects to a mixing chamber 16 on the gun 14. Likewise connecting to the chamber 16 is a conduit 18 extending to a storage tank 20 for drying oils for the alkyd resin material. Typical drying oils utilized for the alkyd resin material are metal soaps such as those selected from the group including lead octoate, zinc octoate, cobalt octoate, calcium octoate, and cobalt naphthenate. The invention contemplates that up to about 5% by weight of drying oils are added to the resin, with the usual weight being about 3%. The feed of the drying oils from the tank 20 to the mixing chamber 16 is by gravity, differential air pressure, or by pump means (not shown). Passing also to the gun 14 is a compressed air conduit 22, with trigger means 24 on the gun controlling the operation of air through the gun, and sometimes opening, as well, valves in the conduits 12 and 18 adjacent the mixing chamber 16.

Associated with the gun 14 is an enlarged supplemental mixing chamber 26 into which the mixture of alkyd resin material and drying oils is passed after leaving the mixing chamber 16 so that a more complete mixing of the alkyd resin material and the drying oils is achieved. A typical enlarged supplementary mixing chamber for a spray gun is disclosed and claimed in my copending patent application Serial No. 345,630, filed February 18, 1964, and entitled "Apparatus for Spraying Resin."

A spray nozzle 28 is removably secured to the supplementary mixing chamber 26, the gun 14 and nozzle 28 being directed downwardly so that, upon operation of the gun in the manner described, a circular pattern of sprayed resin material and drying oils is produced with this pattern being directed against the road surface; so that if movement of the gun 14 along the road surface is effected in the direction of the arrow 30, a marking stripe indicated by the numeral 32 is produced on the road surface.

Drying of the stripe 32 can be accelerated while simultaneously incorporating with the stripe reflective glass beads. This is done by providing a storage tank 34 for reflective glass beads. The tank 34 includes a heating coil 36 through which gases are passed by means of a blow torch or other heater (not shown) so that the temperature of the stored glass beads is raised, for example, to temperatures between about 250° and about 600° F. The glass beads flow, usually by gravity, through a conduit 38 to a discharge head 40 of a spray gun 42 connected to a compressed air line 44. The gun 42 is directed towards the stripe 32 in the manner illustrated in the drawing so that when the trigger 46 is operated, a stream of highly heated glass beads is directed downwardly against the stripe 32 with a force sufficient to embed the glass beads into the stripe 32, both down into the body of the stripe and on the surface thereof.

The highly heated character of the glass beads acts to notably speed up the drying of the hot still wet stripe 32 so that traffic on the road marked with the stripe is held up for the minimum amount of time. The glass beads will act to provide a reflective surface on the stripe not only when the stripe is new but after it has been worn down, this being due to the fact that the pressure of the gun 42 has embedded the glass beads not only into the top but also down into the body of the stripe.

In one embodiment of the invention, between about two pounds and about ten pounds, more usually about six to eight pounds, of beads per gallon of alkyd resin material can be incorporated with this material in the storage tank 10. Alternatively, about two to four pounds of beads per gallon of resin can be incorporated in the resin in tank 10, with between about two pounds and about four pounds of additional beads being sprayed into and onto the stripe 32 by the gun 42, per gallon of stripe forming material. In another embodiment of the invention, all of the glass beads are sprayed hot onto the stripe 32, e.g. in the amount of between about four and about eight pounds of beads per gallon of material used in making the stripe.

The storing of the basic alkyd resin mixture in the tank 10 with the minimum of solvents and drying oils is important for the reason that the formation of a scum or oxidized top coating formed in the tank 10 is minimized. Moreover, the fact that the sprayed material forming the stripe 32 contains mostly drying oils and resin further means that the very hot glass beads can be sprayed by gun 42 into the laid down stripe 32, and to achieve the very rapid drying action described, all without danger of starting a fire.

It is an advantage that, by heating the alkyd resin to an elevated temperature, e.g. to a melt, to decrease its viscosity, lesser amounts of solvents may be used in the resin material, resulting in laying of a coating material containing greater amounts of solid or solidifiable material. Substantially less shrinkage is encountered in the laid coating material, thus markedly decreasing or eliminating the tendency of the coating material to pull away from and unduly expose the glass beads. After the coating material sets, the glass beads are firmly set therein.

While a certain representative embodiment and details have been shown for the purpose of illustrating the invention, it will be apparent to those skilled in this art that various changes and modifications may be made therein without departing from the spirit or scope of the invention.

I claim:

1. That method of applying a marking stripe to a road surface which includes the steps of storing an alkyd resin having coloring pigments therein and having between about 30% and about 80% solids therein, separately storing drying oil for the resin, separately conducting the resin and drying oil to a position adjacent the road surface, heating the resin to a temperature between about 150° and about 275° F. as it is conducted, thoroughly mixing the hot resin and a small portion of drying oil immediately before application to the road surface, spraying the mixture against the road surface while moving over the road surface to provide a stripe, heating reflective glass beads to temperatures between about 250° and about 600° F., and spraying the heated glass beads against the still wet stripe while moving over the road surface to embed the beads into the stripe and heat-speed the drying of the stripe.

2. The method defined in claim 1 wherein the alkyd resin includes between about 10% and about 40% by weight of pigmenting materials.

3. The method defined in claim 1 wherein the drying oil is selected from a group including lead octoate, zinc octoate, cobalt octoate, calcium octoate, and cobalt naphthenate, and in an amount less than about 5% by weight of the pigmented resin.

4. That method of applying a marking stripe to a road surface which includes the steps of storing an alkyd resin having colored pigments therein and having between about 30% and about 80% solids therein, separately storing drying oil for the resin, separately conducting the resin and drying oil to a position adjacent the road surface, heating the resin to a temperature between about 150° and about 275° F., thoroughly mixing the hot resin and a small portion of drying oil immediately before application to the road surface, spraying the mixture against the road surface while moving over the road surface to provide a stripe, heating fine bodied abrasive material to temperatures between about 250° and about 600° F., and spraying the heated abrasive material against the still wet stripe while moving over the road surface to embed the abrasive material into the strip and heat-speed the drying of the stripe.

References Cited

UNITED STATES PATENTS

| | | | |
|---|---|---|---|
| 2,824,502 | 2/1958 | Rockwell et al. | 94—22 |
| 2,833,542 | 5/1958 | Martin. | |
| 2,897,733 | 8/1959 | Shuger | 94—1.5 |
| 3,018,704 | 1/1962 | Searight | 94—44 |
| 3,030,870 | 4/1962 | Gill | 94—1.5 |
| 3,036,928 | 5/1962 | Poole | 94—1.5 X |
| 3,057,273 | 10/1962 | Wilson | 94—44 |

JACOB L. NACKENOFF, *Primary Examiner.*